(12) United States Patent
Chamberlain et al.

(10) Patent No.: US 10,999,876 B1
(45) Date of Patent: May 4, 2021

(54) TIME DIVISION MULTIPLE ACCESS (TDMA) AND CONTENTION ACCESS WAVEFORM NETWORK

(71) Applicant: Rockwell Collins, Inc., Cedar Rapids, IA (US)

(72) Inventors: Scott L. Chamberlain, Cedar Rapids, IA (US); John C. Herder, Cedar Rapids, IA (US); Jonathon C. Skarphol, Robins, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 16/530,154

(22) Filed: Aug. 2, 2019

(51) Int. Cl.
  *H04W 72/04* (2009.01)
  *H04W 74/08* (2009.01)
  *H04W 84/18* (2009.01)

(52) U.S. Cl.
  CPC ... *H04W 74/0841* (2013.01); *H04W 72/0446* (2013.01); *H04W 84/18* (2013.01)

(58) Field of Classification Search
  CPC . H04W 72/04; H04W 72/0446; H04W 72/12; H04W 84/18; H04W 74/00; H04W 74/02; H04W 74/04; H04W 74/08; H04W 74/0808; H04W 74/0816; H04W 74/0825; H04W 74/0833; H04W 74/0841; H04W 74/085; H04W 74/0858; H04L 12/43; H04L 12/413; H04L 12/4035; H04B 7/212

See application file for complete search history.

(56) References Cited

U.S. PATENT DOCUMENTS

| | | | | |
|---|---|---|---|---|
| 7,305,009 B2* | 12/2007 | Gaskill | ................. | H04B 3/542 370/442 |
| 7,639,663 B1* | 12/2009 | Nerses | .................... | H04L 47/24 370/347 |
| 8,254,345 B2* | 8/2012 | Cho | ...................... | H04W 48/12 370/337 |
| 8,488,615 B2* | 7/2013 | Yonge, III | ............ | H04L 45/121 370/395.4 |
| 8,503,480 B2* | 8/2013 | Yonge, III | .......... | H04L 12/2801 370/468 |
| 8,675,678 B2* | 3/2014 | Farrag | ............... | H04W 28/0284 370/447 |
| 8,787,266 B2* | 7/2014 | Matischek | .......... | H04W 72/085 370/329 |
| 2010/0020784 A1* | 1/2010 | Goldfisher | ............ | H04L 12/413 370/347 |

\* cited by examiner

*Primary Examiner* — Tri H Phan
(74) *Attorney, Agent, or Firm* — Suiter Swantz pc llo

(57) ABSTRACT

A system and a method. The system may include a node of a network of nodes. The network may be a combined time division multiple access (TDMA) and contention access (CA) waveform network configured to utilize a combined TDMA and CA waveform. The combined TDMA and CA waveform may include a slot ring. The slot ring may include a plurality of TDMA slots and at least one CA period.

19 Claims, 5 Drawing Sheets

| NETWORK SIZE | FREQ | USER SLOT/SEC | RES % 100% | 90% | 80% | 70% | 60% | 50% | 40% | 30% | 20% | 10% | 0% |
|---|---|---|---|---|---|---|---|---|---|---|---|---|---|
| 16 | 3 | 1500 | 10.7 | 11.9 | 13.3 | 15.2 | 17.8 | 21.3 | 28.0 | 28.0 | 28.0 | 28.0 | N/A |
| 20 | 3 | 1500 | 13.3 | 14.8 | 16.7 | 19.0 | 22.2 | 26.7 | 28.0 | 28.0 | 28.0 | 28.0 | N/A |
| 30 | 3 | 1500 | 20.0 | 22.0 | 25.0 | 28.0 | 28.0 | 28.0 | 28.0 | 28.0 | 28.0 | 28.0 | N/A |
| 40 | 3 | 1500 | 26.7 | 28.0 | 28.0 | 28.0 | 28.0 | 28.0 | 28.0 | 28.0 | 28.0 | 28.0 | N/A |
| 50 | 3 | 1500 | 28.0 | 28.0 | 28.0 | 28.0 | 28.0 | 28.0 | 28.0 | 28.0 | 28.0 | 28.0 | N/A |
| 60 | 3 | 1500 | 28.0 | 28.0 | 28.0 | 28.0 | 28.0 | 28.0 | 28.0 | 28.0 | 28.0 | 28.0 | N/A |
| 70 | 3 | 1500 | 28.0 | 28.0 | 28.0 | 28.0 | 28.0 | 28.0 | 28.0 | 28.0 | 28.0 | 28.0 | N/A |
| 80 | 3 | 1500 | 28.0 | 28.0 | 28.0 | 28.0 | 28.0 | 28.0 | 28.0 | 28.0 | 28.0 | 28.0 | N/A |
| 90 | 3 | 1500 | 28.0 | 28.0 | 28.0 | 28.0 | 28.0 | 28.0 | 28.0 | 28.0 | 28.0 | 28.0 | N/A |
| 100 | 3 | 1500 | 28.0 | 28.0 | 28.0 | 28.0 | 28.0 | 28.0 | 28.0 | 28.0 | 28.0 | 28.0 | N/A |
| 110 | 3 | 1500 | 28.0 | 28.0 | 28.0 | 28.0 | 28.0 | 28.0 | 28.0 | 28.0 | 28.0 | 28.0 | N/A |
| 120 | 3 | 1500 | 28.0 | 28.0 | 28.0 | 28.0 | 28.0 | 28.0 | 28.0 | 28.0 | 28.0 | 28.0 | N/A |

Worst Case Asynchronous Service Message Latency (ms) - Selected for Contention Access Transmissions

TIME DIVISION MULTIPLE ACCESS (TDMA) AND CONTENTION ACCESS WAVEFORM NETWORK

BACKGROUND

A standard time division multiple access (TDMA) waveform may experience message transmit latency issues in a wireless network with a large network size (e.g., a large number of nodes or participants, such as aircraft and/or ground stations) and variable transmit message service conditions (e.g., synchronous service versus asynchronous service messages allocations). A transmit message latency (e.g., delay) is the time delay between the time when a message is received in a participant's transmit queue to the time when the message is transmitted over-the-air (OTA). The transmit latency issues due to network size may be related to the TDMA network slot allocations where the transmit slots for all network participants are to be managed to ensure that transmit slots from multiple participants do not "collide" (e.g., interfere) with each other. A TDMA schedule shared among multiple nodes often cannot be changed quickly enough to meet the demand for low-latency, asynchronous, ad-hoc communications. For example, in cases where the scheduled TDMA transmission interval is 5 messages per second, (e.g., every 200 milliseconds (ms)) and yet some messages are required to be transmitted every 25 ms, the TDMA method may be unable to quickly respond to the demand for ad-hoc, low-latency message transmissions. The TDMA network may provide transmit opportunities (e.g., transmit slots allocations) for each network participant based on the following mission parameters: number of participants in the network (e.g., network size), network responsiveness (%) (e.g., relative allocation between asynchronous service and synchronous service messages), TDMA user slot rate (e.g., slot rate) (Slots/Sec), and number of radio frequency (RF) channels used in the network. These parameters may be used to determine the transmit opportunity rate for each network participant. A participant's transmit opportunity (TO) rate may reflect message transmit latency, where Latency=1/TO.

For example, the asynchronous service message latency can be significant with a large network size (e.g., 120 participants) and a high synchronous service allocation (e.g., 90% synchronous service allocation); for such an exemplary case, the worst case asynchronous service message latency could be 800 ms, from the time when the asynchronous message was received in the participant's transmit queue to the time when the message is transmitted OTA. In some applications, 50 ms or more latency may be undesirable.

SUMMARY

In one aspect, embodiments of the inventive concepts disclosed herein are directed to a system. The system may include a node of a network of nodes. The network may be a combined time division multiple access (TDMA) and contention access (CA) waveform network configured to utilize a combined TDMA and CA waveform. The combined TDMA and CA waveform may include a slot ring. The slot ring may include a plurality of TDMA slots and at least one CA period.

In a further aspect, embodiments of the inventive concepts disclosed herein are directed to a method. The method may include configuring a network to be a combined time division multiple access (TDMA) and contention access (CA) waveform network utilizing a combined TDMA and CA waveform, wherein the combined TDMA and CA waveform includes a slot ring, wherein the slot ring includes a plurality of TDMA slots and at least one CA period.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIG. 4 shows a table showing a worst case transmit latency for asynchronous service messages selected for contention access transmissions for an exemplary embodiment according to the inventive concepts disclosed herein.

DETAILED DESCRIPTION

Figure 1:
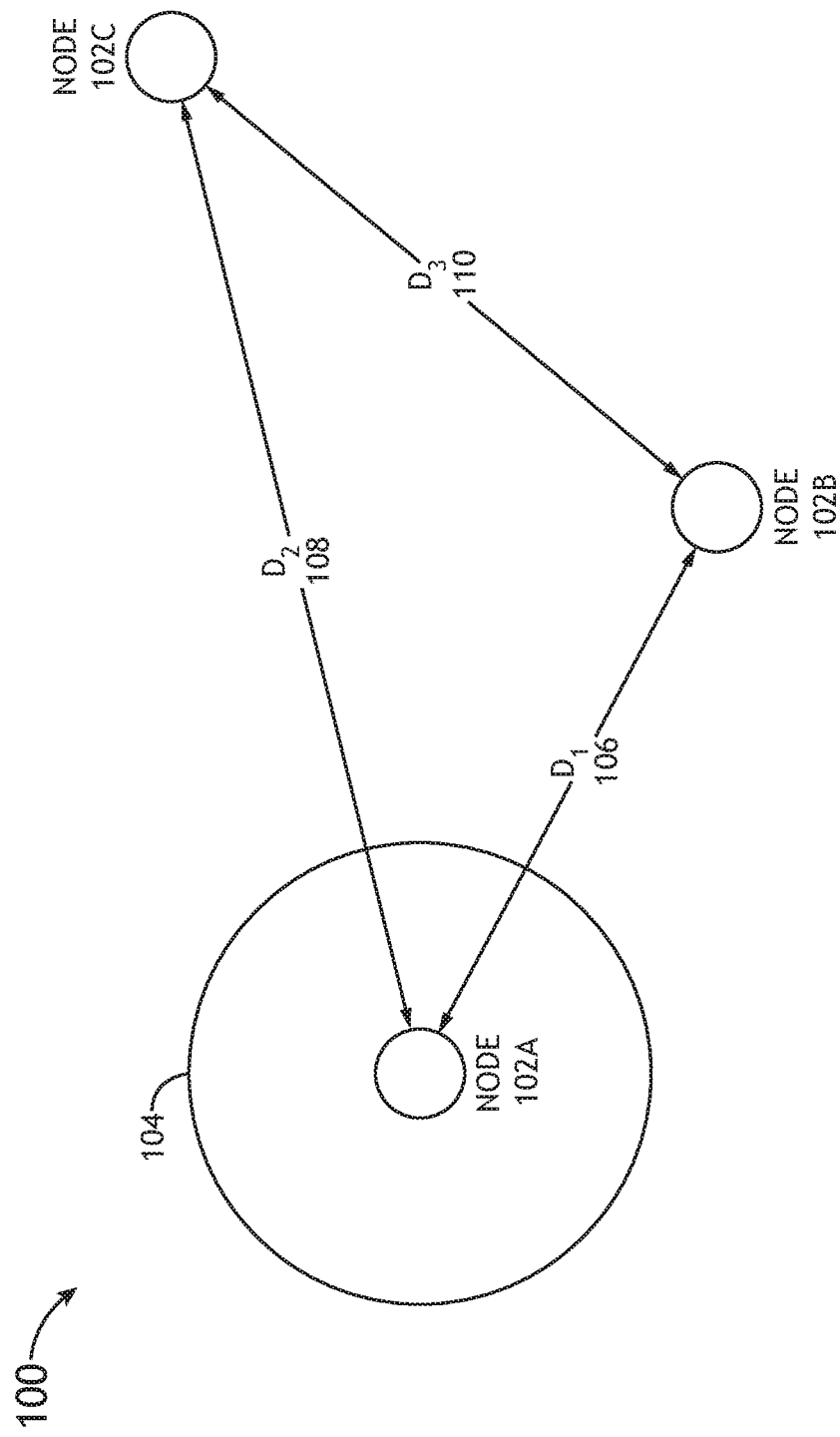
FIG. 1 is a block diagram of an example embodiment of a system for managing network communications, in accordance with some embodiments of the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a method and a system including a node of network, wherein the network utilizes a TDMA and contention access waveform.

A standard TDMA waveform may divide the waveform's over-the-air (OTA) transmit opportunities into many time "slots" of fixed duration to support network media access. A TDMA waveform may have a frame cycle (which may also be referred to as a slot ring) which is a period of time in which slot allocations repeat; for example, a slot ring may be a 10 second period in which 10,000 slots are allocated with 1.00 ms per slot. The allocation of slot times may allow the network to manage node-to-node packet transmissions such that the probability of packet collisions (e.g., multiple OTA packets or signals interfering with each other in time and frequency) may be minimized. When OTA signals "collide" at a receiver in time and frequency in a standard TDMA network, the probability of signal errors may increase significantly, and network performance may be reduced related to the signal distortion caused by the signal collisions.

Standard TDMA networks typically utilize relatively low bandwidth (e.g., transmit frequency allocations) to support a high data rate network due to their control of signal transmissions and their minimization of packet collisions. However, due to their need to control signal transmissions, standard TDMA networks may experience transmit delays (e.g., latency) in large networks as allocated time between transmit opportunities for a given network node increases in the desire to prevent packet collisions. Larger networks may imply more network nodes and more allocated slots; more allocated slots may increase the allocated time between transmit opportunities for a given network node. Transmit latency may be an issue for networks that have time critical messages (e.g., packets) that require minimal time durations between when a message is input at a node's message source to the time the message is transmitted OTA to facilitate time critical data on the receiver.

For a standard TDMA network, a method to mitigate the transmit latency may be to reduce the number of nodes in the network (which may be undesirable or impossible in some networks), to increase a complexity of the TDMA slot allocation algorithm to prioritize time critical packets within the overall slot allocation methods (which may not be desirable in an already complex slot allocation algorithm), and/or to add additional transmit and receive frequencies to increase the number of network transmit slots available for allocation, thereby shortening the interval between transmit opportunities for a given network node (which may be undesirable or impossible in some networks related to the additional frequency bandwidth requirements).

Contrary to a standard TDMA waveform, a standard contention access (CA) waveform may access network media (e.g., OTA transmissions) without regard to time slot allocations. Instead, for a contention access waveform, if a packet is available for transmission on a given network node, that packet may be transmitted without regard to other network traffic. This "transmit-on-demand" approach may be relatively simple as compared to a standard TDMA network as no time slot planning or propagation slots may be necessary. Unlike a standard TDMA waveform, a standard contention access waveform may not be concerned with packet collisions; instead, the standard contention access waveform may plan for packet collisions by adding stronger error correction codes to increase signal redundancy within a packet enabling enhanced error correction at the receiver and dividing data packets into smaller transmit data pulses and providing time and frequency diversity with each data pulse. Standard contention access networks may correct signal distortion that occurs in an OTA transmission rather than preventing that signal distortion from occurring as in a standard TDMA approach.

For standard contention access networks, if proper signal correction methods are applied, a high data rate network performance may be achievable similar to the standard TDMA approach. However, the standard contention access approach's time and frequency diversity requirements may levy much larger radio frequency bandwidth requirements for a medium-to-large network as compared to the standard TDMA approach. This larger bandwidth requirement can limit the number of nodes or network message capacity in a given network wherever frequency allocations are limited, and further constrain the network node count and network message capacity where multiple networks must be operated in the same or in nearby geographic areas.

Some embodiments may include a combined TDMA and contention access waveform to reduce latency as compared to a standard TDMA waveform. The combined TDMA and CA waveform may include a transmission schedule for both TDMA and CDMA transmissions, which is defined here as a slot ring. The slot ring schedule is determined by the processing nodes in the network, and may be a fixed schedule, or dynamically calculated by one or more processors in the network. In some embodiments, low-latency messaging may be realized as selected asynchronous, time critical transmissions may be allocated to transmit during contention access periods within a TDMA slot ring. In some embodiments, using contention access transmissions within a TDMA slot ring may yield a significant transmit latency reduction relative to a standard TDMA network for latency critical nodes within a large OTA network. A combined TDMA and contention access waveform may enable low-latency messaging while maintaining the bandwidth of a standard TDMA network.

For example, a standard TDMA network may experience significant transmit latency (e.g., 800 ms of transmit latency) compared to a combined TDMA and CA waveform network under similar network conditions which may have a significantly less transmit latency (e.g., 25 ms) for selected low-latency packets. In a particular exemplary setup of a standard TDMA network, the 800 ms TDMA transmit latency may be under worst case conditions with a high overhead message requirement of 90% in a large network of 120 network nodes; in another particular exemplary setup of a standard TDMA network, an overhead message requirement of 30% and a large network of 120 may result in a maximum latency of 116 ms. In addition, for example, for the combined TDMA and CA waveform network, the low-latency, asynchronous, contention access service message maximum latency may be constant at 25 ms independent of the network size or synchronous service message allocation.

In some embodiments, a combined TDMA and CA waveform may afford the benefits of each of a TDMA waveform and a CA waveform and may minimize the weakness of each waveform to provide a single optimized waveform. For example, a standard TDMA waveform may provide a narrow transmit bandwidth and a high throughput data rate at the expense of transmit latency under large network conditions as limited slot opportunities may reduce the transmit opportunities for a given node. On the other hand, a standard contention access waveform may allow for low-latency transmissions and high data throughput at the expense of high bandwidth transmissions related to the error coding and frequency diversity utilized to protect transmit data pulses. In some embodiments, the combined TDMA and CA waveform may provide low-bandwidth and high data rate transmissions for nodes utilizing best effort transmissions and may provide low-latency and high data rate transmissions for nodes utilizing low-latency transmissions, while still realizing a low-bandwidth transmit signature.

In some embodiments, the combined TDMA and CA waveform may realize a narrow bandwidth and a high throughput data rate of a standard TDMA waveform and the low-latency transmissions and high data throughput of a standard CA waveform within a single optimized waveform. Some embodiments may include a dynamic approach for allocating the CA transmit periods within a TDMA network to meet the transmit latency requirements for low-latency critical packets while maintain the low-bandwidth TDMA transmission on a packet-by-packet basis.

Referring to FIG. 1, one example embodiment of a system 100 for managing network communications is depicted. The system 100 may correspond to a network (e.g., a combined TDMA and CA waveform network) that may include any number of communications nodes 102A-N. In the example illustrated in FIG. 1, there are three communications nodes, a first communications node 102A, a second communications node 102B, and a third communications node 102C, although the inventive concepts disclosed herein are not limited to any particular number of nodes. Each of the communications node 102A-N may include any form or type of computing device with communications capabilities and may be mobile or stationary. For example, a communications node 102A-N may include but not limited to a laptop, desktop computer, cellular/smart phone, tablet, vehicle (e.g., aircraft, automobile, watercraft, and spacecraft), robotic device, household/office/military appliance or device, satellite, or pseudolite.

In the network environment of system 100, each of the communications node 102A-N may transmit data packets to, and may receive data packets from, all of other communications nodes 102A-N in the group of nodes 102A-N and/or a given frequency channel for instance. The propagation distance of transmitted packets may differ among the communications nodes. As such, when a communications node 102A-N transmits a data packet, the wave front 104 of the signal carrying the data packet may arrive at different times at different communications nodes 102A-N. In the example depicted in FIG. 1, the propagation distance 106 between the first communications node 102A and the second communications node 102B may be D_1, the propagation distance 108 between the first communications node 102A and the third communications node 102C may be D_2, and the propagation distance 110 between the second communications node 102B and the third communications node 102C may be D_3. The propagation distance 106 may be less than the propagation distance 108 (D_1<D_2). Further, the propagation distance 110 may be less than the propagation distance 108 (D_3<D_2). In this example, when the first communications node 102A transmits a data packet to all the other communications nodes in the network environment of system 100, the wave front 104 of the signal carrying the data packet may arrive at the second communications node 102B prior to arriving at the third communications node 102C. As such, there may be some free time in the frequency channel between the first communications node 102A and the second communications node 102B, prior to the arrival of the data packet at the third communications node 102C. The free time may be compensated within the TDMA system by adding propagation slots to the slot structure.

Figure 2:
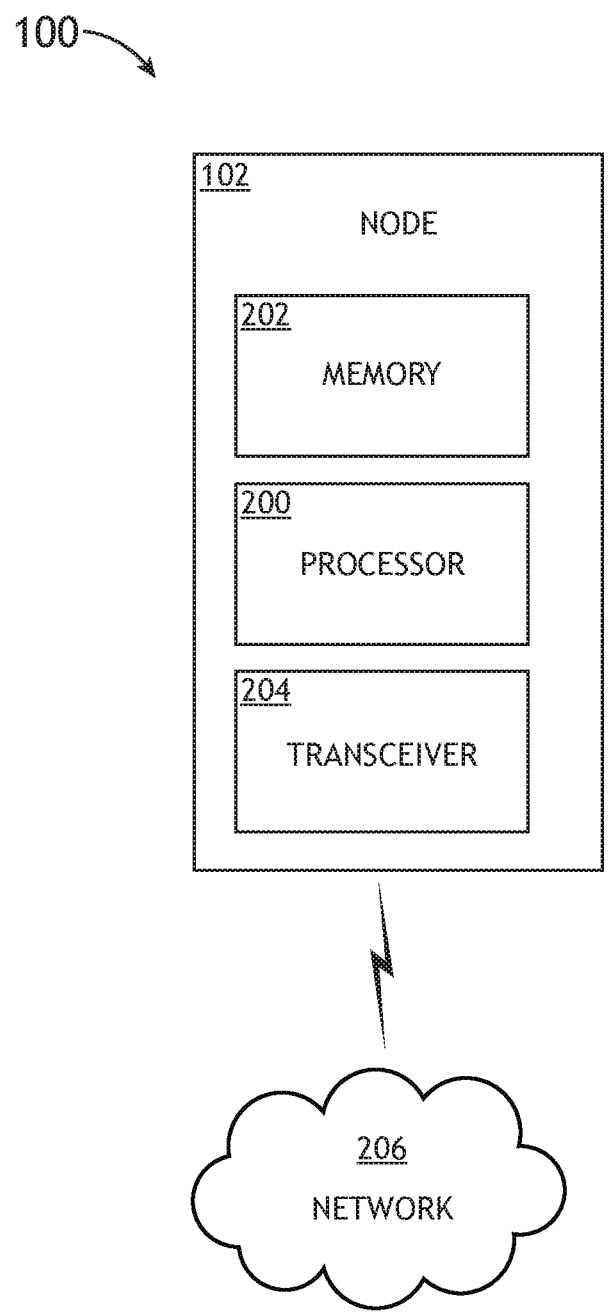
FIG. 2 shows a block diagram of an example embodiment of an architecture for communications nodes in a network environment of a system for managing network communications, in accordance with some embodiments of the inventive concepts disclosed herein.

Referring now to FIG. 2, an example embodiment of architectures for communications nodes 102A-N of the network in the system 100 for managing network communications is depicted. Each communications node 102 may include at least one processor 200, at least one memory 202, and at least one transceiver 204, and be in communications with and/or be a part of a network 206 (e.g., a combined TDMA and CA waveform network). The processor 200 may be implemented as a microprocessor unit, an application-specific integrated circuit (ASIC), and/or a field-programmable gate array (FPGA), among others. In some embodiments, the at least one processor 200 may include a multi-core processor or an array of processors. The at least one processor 200 may execute programmable instructions stored in the memory 202 causing the processor 200 to carry out any of the operations disclosed throughout. The memory 202 may include electronic, optical, magnetic, or any other storage device capable of relaying or providing the processor 200 with program instructions. The transceiver 204 may include a transmitter to transmit data and/or one or more packets to other communications nodes 102A-N via the network 206, and a receiver to receive one or more packets from the other communications nodes 102A-N via the network 206. The transmitter and the receiver of the transceiver 204 may include a built-in adapter, a wireless network adapter, modem, or any other device capable of interfacing (e.g., wirelessly interfacing) with the one or more other communications nodes 102A-N via the network 206 through a variety of connections. The network 206 may include other communications nodes 102A-N of the network environment of system 100.

Figure 3:
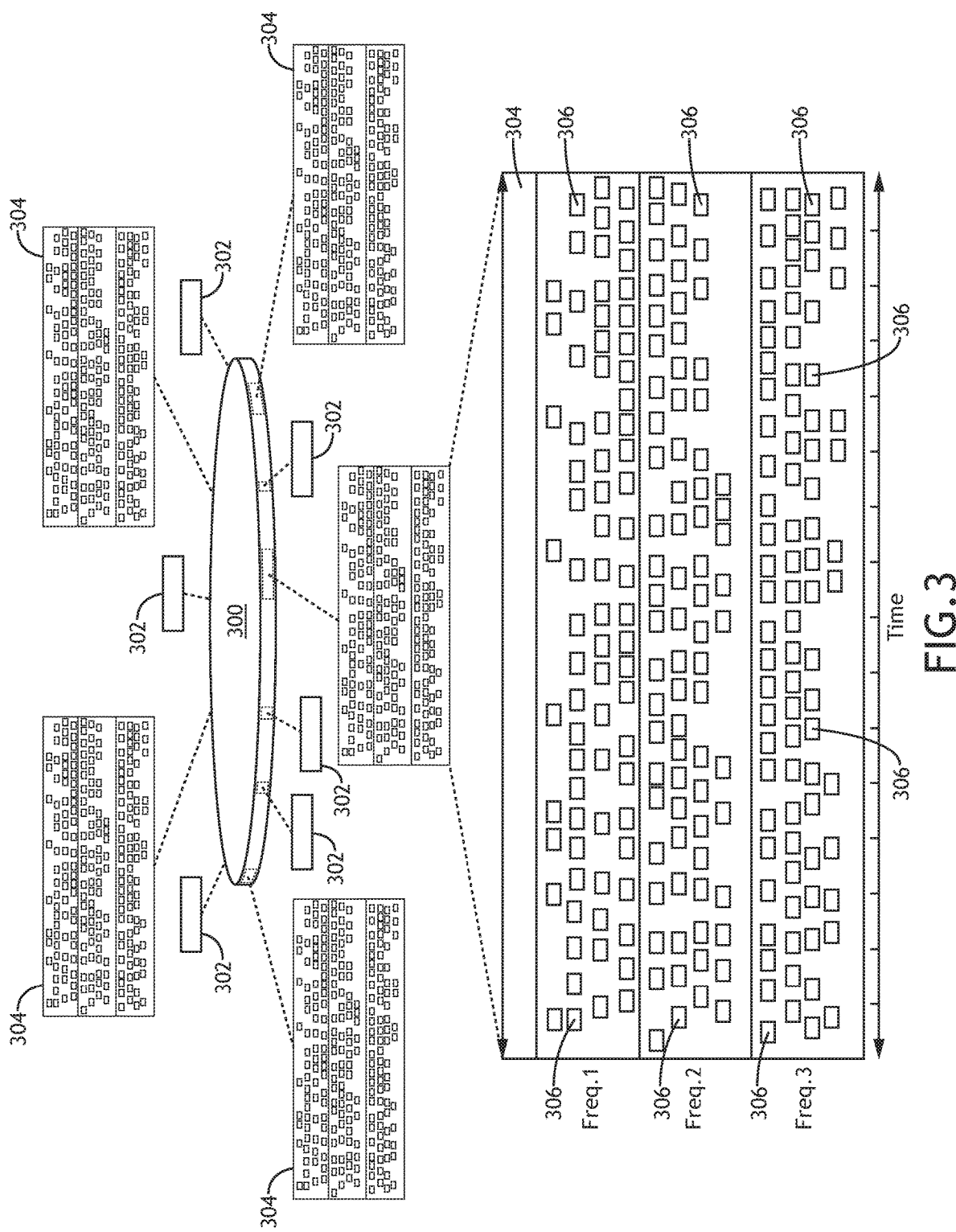
FIG. 3 shows an exemplary embodiment of a combined TDMA and CA waveform of a combined TDMA and CA waveform network according to the inventive concepts disclosed herein.

Referring now to FIG. 3, an exemplary embodiment of a combined TDMA and CA waveform of a combined TDMA and CA waveform network according to the inventive concepts disclosed herein is depicted. The combined TDMA and CA waveform may include a slot ring 300. The slot ring 300 may include a plurality of TDMA slots 302 and at least one CA period 304. In some embodiments, if no nodes 102

"sign-up" for the low-latency contention access service, the system will act a standard TDMA service with no contention access periods allocated. In some embodiments, the combined TDMA and CA waveform may be configured to dynamically change the allocation of CA periods 304 by adding CA periods 304 on-the-fly when more CA periods 304 are required and/or by removing CA periods 304 on-the-fly when some or all of the CA periods 304 are not required. In some embodiments, such flexibility may make the system more efficient by allocating resources where they are most needed. The slot ring 300 may have any suitable duration and any suitable number of TDMA slots 302 and CA periods 304. Each of the TDMA slots 302 may have any suitable duration. Each of the CA periods 304 may have any suitable duration, and the CA periods 304 may be uniformly or non-uniformly spaced within the slot ring 300. For example, the slot ring 300 may have a duration of approximately 100 ms with 100 TDMA slots 302 (e.g., 50 pairs of slots) and 5 overhead slots. For example, each of the TDMA slots 302 may have a duration of 100 microseconds. Additionally, for example, a remainder (e.g., a 40 microsecond remainder) may be added to a last slot 302 of the slot ring 300. Additionally, for example, CA periods may replace of a group of slots 302 of the slot ring 300 to provide CA transmit access to select nodes 102 requiring low-latency data transmissions. For example, the slot ring 300 may have 5 CA periods 304. For example, the CA periods 304 may each have a duration of 8 ms.

The TDMA slots 302 may be utilized for normal traffic (e.g., scheduled and asynchronous transmissions that do not require low latency) and/or traffic with low-latency requirements that are met by the standard TDMA network, for example, due to a reduced network size.

The CA periods 304 may be utilized by nodes 102 with low-latency transmit requirements. Each CA period 304 may support any suitable number of packets transmitted from any suitable nodes 304 assigned to a given CA period 304. Each CA period may support CA transmissions on any suitable number of frequencies (e.g., 3 frequencies as shown in FIG. 3). Each packet may include any suitable number of data pulses 306, each which may have a start time (e.g., a pseudo-random start time), a frequency hop (e.g., a pseudo-random frequency hop), and a duration (e.g., a pseudo-random duration) between pulses. For example, as shown in FIG. 3, each packet transmitted by a given node 102 may be transmitted as data pulses 306 (e.g., 20 data pulses). For example, each node 102 transmitting during a CA period 304 may be given a transmit ID, which may be numbered between 1 and any suitable number of CA transmitters (e.g., 12 CA transmitting nodes as shown in FIG. 3). A node's 102 transmit ID may identify the node's 102 data pulses 306. A node's 102 transmit ID may determine each data pulse start time, frequency hop pattern, and duration between the node's 102 data pulses 306.

In some embodiments, the combined TDMA and CA waveform may reduce transmit latency as compared to a standard TDMA waveform. Contention access may allow transmissions from multiple participants during the same period of time, unlike a standard TDMA network where slot transmit times are managed to prevent OTA transmit collisions. The contention access simultaneous transmits may allow more message transmission in a given time period thereby reducing transmit latency. The combined TDMA and CA waveform may include the slot ring 300 with a slot manager (e.g., which may be software executed by one or more of the processors 200 of one or more nodes 102) that may allocate synchronous service and non-low-latency asynchronous service messages (e.g., via the TDMA slots 302) and low-latency asynchronous service messages (e.g., via the CA periods 304) for transmit OTA. The slot manager may allocate transmit opportunities for each network node 102, for example, based on specific mission parameters. In addition, the combined TDMA and CA waveform may have multiple CA periods 304 in which CA transmissions may occur, which may reduce latency for select low-latency messages.

For example, the slot ring 300 may be 100 ms in duration and include 5 CA periods 304 each of 8 ms duration and 52 TDMA slots 302, which may be allocated uniformly within the slot ring 300. As shown in FIG. 3, during each 8 ms CA period 304, multiple select low-latency asynchronous service messages may be transmitted simultaneously using contention access transmissions. For example, low-latency messaging may be realized as the selected asynchronous messages may be allocated to transmit every approximately 30 ms within the CA periods 304, for the combined TDMA and CA waveform, rather than every 133 ms for a standard TDMA network with a 120 participant network size and 40% scheduled service message allocation network. For example, low latency asynchronous message latency may be calculated as: Latency=((100 ms−(5*8 ms))/5+8 ms*2)=28 ms. In addition, the low latency asynchronous service message maximum latency, using CA periods 304, may be constant at 30 ms independent of the network size or synchronous service message allocation.

For example, a standard TDMA network may have 90% of its packets transmissions as standard transmissions requiring best effort connectivity between the transmit node and receive node, whereas, the other 10% may require low-latency requirements to support time critical data transmission between the transmitter and receiver. A standard TDMA only waveform may have significant transmit latency issues for 10% of its transmissions in highly populated networks (e.g., >100 nodes). For example, CA only waveform may require a significant bandwidth (e.g., 24 Megahertz (MHz) bandwidth compared to 3.2 MHz for TDMA) to support transmissions in highly populated networks (e.g., >100 nodes). In some embodiments, a combined TDMA and CA waveform may optimize transmit bandwidth and transmit latency by allocating standard TDMA slots 302 to node transmissions not requiring low-latency transmission (e.g., 90% of packet transmissions for an exemplary situation) and may lower bandwidth requirements by limiting contention access transmissions to only those transmissions requiring low latency connectivity (e.g., 10% of packet transmissions for the exemplary situation). For example, the combined TDMA and CA waveform may support all low-latency transmissions and all best effort transmissions within a 4.8 MHz bandwidth for the exemplary situation, where three frequencies are used with 1.6 MHz bandwidth for each frequency (3*1.6 MHz=4.8 MHz).

In some embodiments, the combined TDMA and CA waveform may utilize a strong error correction code rate, an increased symbol rate, and at least three transmit frequency channels during the CA periods 304 to support the contention access transmissions. A strong error correction code rate may be utilized to protect the contention access synchronization and data pulses 306 from pulse collisions caused by simultaneous transmissions. An increased symbol rate may be utilized to provide adequate data payload due to the payload reduction required with an increased error correction code rate. Three transmit frequencies may be utilized for frequency diversity within the simultaneously transmitted synchronization and data pulses 306. For example, 12 messages (e.g., from 12 nodes) can be transmitted OTA simultaneously during an 8 ms CA period 304 using a ⅓ error correction code rate waveform and a 2.0 MHz symbol rate.

A high-fidelity simulation was performed to estimate the contention access packet error rate (PER) performance of an exemplary combined TDMA and CA waveform network of an exemplary embodiment and verify that the exemplary combined TDMA and CA waveform network was viable. The simulation was performed for several tests, frequency bands, and test transmitter to test receiver ranges. The simulation included a test transmitter node and interferer nodes with the position of interferers included in the simulation tests. For this simulation, the tests had 11 interferers (for a total of 12 transmitters-1 test transmitter and 11 interferers) positioned at various ranges from the test receiver. The simulation measured packet error rate at various Ec/No settings. Ec/No may be the received energy per chip divided by the power density in the band. The Ec/No to range relationship is calculated using the waveform link budget. Simulations were performed at 1850 MHz frequency band and in the 2400 MHz frequency band.

The test objective for this simulation is for the packet error rate to be less than 5% (objective PER) when the range between the test transmitter and the test receiver is less than or equal to 100 nautical miles (nmi) (objective range). The threshold is for the packet error rate to be less than 10% (threshold PER) when the range between the test transmitter and the test receiver is less than or equal to 80 nmi (threshold range). For tests at 1850 MHz, the contention access PER performance met the PER or range objective for each simulation. For tests at 2400 MHz, the contention access PER performance meet the PER and range threshold.

Still referring to FIG. 3, some embodiments may include a processor 200 of a particular node 102 of a combined TDMA and CA waveform network allocating CA periods 304 and selecting nodes 102 for CA service. In some embodiments, CA transmit periods 304 may be implemented using multiple methods. For example, one method may be implemented by utilizing fixed CA transmit periods 304 at system 100 configuration, and a second method may be implemented by utilizing dynamic allocation of CA transmit periods 304 performed by a processor 200 (e.g., a network controller) during system 100 operation.

In a standard, dynamic TDMA network, a processor 200 (e.g., a network controller) manages the transmit slot allocations for each network node 102 and distributes this information to the nodes 102 OTA. By managing the transmit TDMA slots 302, each node 102 knows its "transmit opportunities"—the slot times within the TDMA structure that a node is scheduled to transmit data. If addition, for new nodes 102 joining the network, the network controller will update the transmit slot allocations and inform the network nodes 102 of their new transmit opportunities (e.g., TDMA slots 302).

In some embodiments, for networks with nodes 102 that require low-latency, high-priority messaging (e.g., weapon simulations for a combat training network), the network controller may invoke the CA transmit service by allocating CA transmit periods 304 and assigning selected nodes to transmit within those CA periods 304. The network controller may re-assign the TDMA slots 302 and may add the CA transmit periods 304 to the transmit structure (e.g., the slot ring 300). The network controller may inform (e.g., broadcast to) all of the network nodes 102 of the new network transmit structure (e.g., the slot ring 300).

In some embodiments, the processor 200 (e.g., the network controller) of a particular node 102 of a combined TDMA and CA waveform network may be configured to adjust the number and duration of the CA transmit periods 304 allocated within the transmit structure (e.g., the slot ring 300), for example, based at least on the number of nodes 102 that "sign up" for the CA transmit service, the transmit latency requirement for those nodes 102, and/or the combined TDMA and CA waveform structure (e.g., the slot ring 300). A node 102 may "sign up" for this CA service by informing the processor 200 (e.g., the network controller) of a particular node 102 that the node 102 has a sequence of low-latency, high-priority messages to transmit and may indicate the latency requirement of the messages. The processor 200 (e.g., the network controller) of a particular node 102 may respond and allocate an appropriate CA transmit period(s) 304 and duration(s) to support the number of nodes 102 that have signed up for this CA service and the low-latency requirements for the "selected" nodes 102. In addition, the processor 200 (e.g., the network controller) of a particular node 102 may inform the CA service requestor node 102 of the requestor node's 102 time and frequency hops parameters to use for transmitting the requestor node's 102 transmit data pulses 306 within each CA period 304.

For example, some embodiments may include combined TDMA and CA waveform networks configured to have transmit packet latency achieved for a given maximum latency requirement for a set of network parameters. For example, an exemplary combined TDMA and CA waveform network may have a 100 ms slot ring 300 cycle with a 25 ms maximum latency requirement and three 1.6 MHz frequencies for transmit. The 25 ms maximum latency requirement latency may allow for a number (e.g., 0 to 12) of CA nodes that could be allocated to the combined TDMA and CA waveform network. For example, an allocated CA period 304 with a duration of 8 ms and 12 latency critical nodes 102 may be kept constant to be optimal based on simulations, although other such parameters could be modified for certain network situations while still achieving suitable performance. The number of CA periods 304 per slot ring 300 cycle may be calculated and implemented to meet a latency requirement for a given case (e.g., to achieve 25 ms latency, the network may utilize 6 CA periods 304 per slot ring 300 cycle to meet the CA latency requirement). For example, Latency=(TDMA Cycle–CA Period*#CA Periods per TDMA Cycle)/#CA Periods per TDMA Cycle+CA Period*2; Latency=(100 ms-8 ms*6)/6+8 ms*2=24.7 ms maximum latency for this example.

Some embodiments may include a processor 200 allocating (e.g., dynamically allocating) CA transmit periods 304 within the combined TDMA and CA waveform network to meet transmit latency requirements for low-latency critical packets. On a CA period 304 by CA period 304 basis, the processor 200 may set the CA transmit allocations based at least on network requirements and/or parameters, such as slot ring cycle duration, maximum latency requirements, number of transmit/receive frequencies, and/or total number of nodes 102 requiring the CA transmit service.

For example, if more than 12 low-latency, high-priority nodes request the CA transmit service, the processor 200 (e.g., the network controller) may allocate additional CA periods 304 or add additional duration (e.g., beyond 8 ms) to the existing CA periods 304 to support the additional low-latency traffic. Also, if the transmit latency requirement is reduced relative to a current value, the network controller may allocate additional CA periods to reduce the latency for the selected CA nodes. For example, based on dynamic CA period application, the network controller can optimize the CA periods 304 to meet message latency requirements and number of nodes requiring the CA service.

In some embodiments, the more nodes that "sign up" for the CA transmit service, the more efficient the service may be to the network. For example, if only one node signs up for the CA transmit opportunities within the network structure (e.g., the slot ring 300) while the node 102 using contention access may realize low-latency messaging, the other network nodes 102 using the TDMA slot 302 based service may experience a reduction in their transmit opportunity rate and therefore a reduction in the overall network data rate and increase in their transmit latency. When allocating the contention access-based service in a network with few nodes requiring time critical transmissions, it may be important to evaluate the network conditions to determine the trade-off between aggregate network data rate and transmit latency versus low-latency transmission for time critical messages.

In some embodiments, the combined TDMA and CA waveform network may be implemented as a centrally controlled or an autonomous network.

Where the combined TDMA and CA waveform network is a centrally controlled network, the processor 200 (e.g., a datalink controller and/or a central controller) of a particular node 102 (e.g., often on a ground node 102) may manage the connectivity between all nodes 102 in the network, e.g., in the air and/or on the ground. In addition, the processor 200 may manage the nodes 102 that ingress into and egress out of the network. Any network changes, e.g., slot allocations, new nodes in the network, network and/or mission operator changes, etc., may be managed by the processor 200 and may be communicated to all of the network nodes 102.

Where the combined TDMA and CA waveform network is an autonomous controlled network, the autonomous network may lack a central controller, thus, all network events may be managed aggregately by all nodes 102 in the network. Such an autonomous network may lack a datalink controller or scheduled services within the network, and the autonomous network may have only asynchronous unicast and broadcast events that may be generated by the individual network nodes 102. The autonomous network may be a self-forming ad-hoc network (e.g., a mobile ad-hoc network (MANET)) that may utilize a dynamic algorithm executed by each network node 102 that may allow new nodes 102 to enter the network and communicate with all other network nodes 102. In an autonomous network, network identity may be important for robustness and nimbleness, node management may be performed without central control, and network size can be adjusted in an autonomous and ad-hoc manner.

Referring now to FIG. 4, a table shows a worst case transmit latency for the low latency asynchronous service messages selected for contention access transmissions for an exemplary embodiment.

Figure 5:
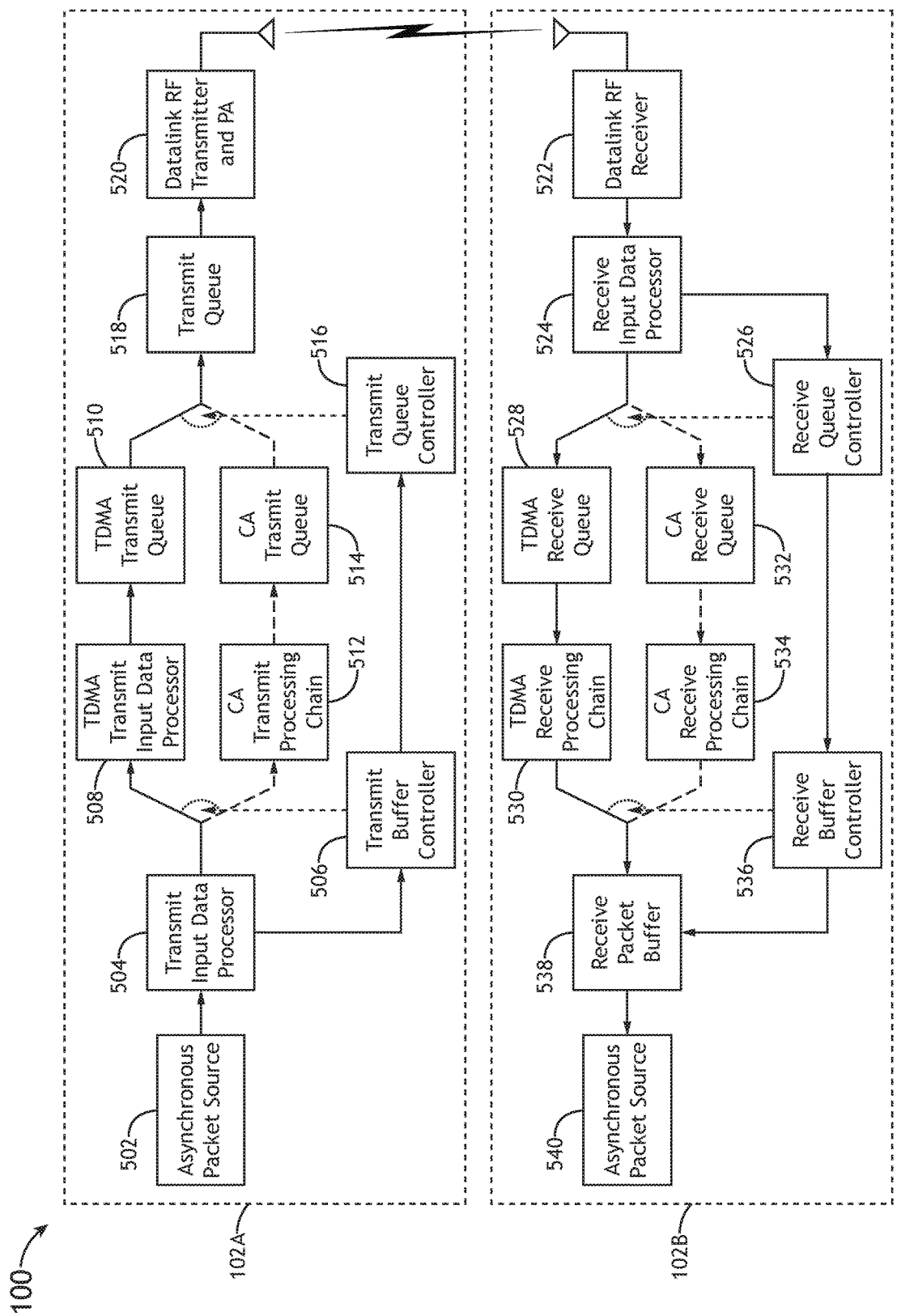
FIG. 5 shows an exemplary embodiment of a combined TDMA and CA waveform network of the system of FIG. 1 according to the inventive concepts disclosed herein is depicted.

Referring now to FIG. 5, an exemplary embodiment of a combined TDMA and CA waveform network of the system 100 according to the inventive concepts disclosed herein is depicted. The combined TDMA and CA waveform network may include a first node 102A (e.g., a transmitting node) and a second node 102B (e.g., a receiving node), wherein the first node 102A may transmit to the second node 102B, and vice versa. FIG. 5 shows exemplary transmit and receive processing chains of the two nodes 102A, 102B.

The first node 102A may include an asynchronous packet source 502, a transmit input data processor 504, a transmit buffer controller 506, a TDMA transmit processing chain 508, a TDMA transmit queue 510, a CA transmit processing chain 512, a CA transmit queue 514, a transmit queue controller 516, a transmit queue 518, and a data link RF transmitter and power amplifier (PA) 520, some or all of which may be communicatively coupled. Additionally, the first node 102A may include the elements of the second node 102B.

The second node may include a datalink RF receiver 522, a receive input data processor 524, a receive queue controller 526, a TDMA receive queue 528, a TDMA processing chain 530, a CA receive queue 532, a CA receive processing chain 534, a receive buffer controller 536, a receive packet buffer 538, and an a synchronous packet sink 540, some or all of which may be communicatively coupled. Additionally, the second node 1026 may include the elements of the first node 102A.

In some embodiments, the at least one processor 200 may include and/or be implemented as any or all of the network controller, the datalink controller, the transmit input data processor 504, the transmit buffer controller 506, the TDMA transmit processing chain 508, the CA transmit processing chain 512, the transmit queue controller 516, the receive input data processor 524, the receive queue controller 526, the TDMA processing chain 530, the CA receive processing chain 534, the receive buffer controller 536, the asynchronous packet source 502, and/or the asynchronous packet sink 540.

In some embodiments, the at least one memory 202 may include and/or be implemented as any or all of the TDMA transmit queue 510, the CA transmit queue 514, the transmit queue 518, the TDMA receive queue 528, the CA receive queue 532, the receive packet buffer 538, the asynchronous packet source 502, and/or the asynchronous packet sink 540.

As will be appreciated from the above, embodiments of the inventive concepts disclosed herein may be directed to a method and a system including a combined TDMA and CA waveform network.

As used throughout and as would be appreciated by those skilled in the art, "at least one non-transitory computer-readable medium" may refer to as at least one non-transitory computer-readable medium (e.g., memory 202; e.g., at least one computer-readable medium implemented as hardware; e.g., at least one non-transitory processor-readable medium, at least one memory (e.g., at least one nonvolatile memory, at least one volatile memory, or a combination thereof; e.g., at least one random-access memory, at least one flash memory, at least one read-only memory (ROM) (e.g., at least one electrically erasable programmable read-only memory (EEPROM)), at least one on-processor memory (e.g., at least one on-processor cache, at least one on-processor buffer, at least one on-processor flash memory, at least one on-processor EEPROM, or a combination thereof), or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof), or a combination thereof).

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system, comprising:
    a node of a network of nodes, wherein the network is a combined time division multiple access (TDMA) and contention access (CA) waveform network configured to utilize a combined TDMA and CA waveform, wherein the combined TDMA and CA waveform includes a slot ring, wherein the slot ring includes a plurality of TDMA slots and at least one CA period,
    wherein the combined TDMA and CA waveform utilizes a strong error correction code rate as compared to a standard TDMA waveform, an increased data rate as compared to the standard TDMA waveform, and at least three transmit frequency channels to support CA transmissions.

2. The system of claim 1, wherein the combined TDMA and CA waveform reduces transmit latency as compared to a standard TDMA waveform under similar network conditions.

3. The system of claim 1, wherein the combined TDMA and CA waveform network is a centrally controlled network.

4. The system of claim 1, wherein the combined TDMA and CA waveform network is an autonomous network.

5. The system of claim 1, wherein a quantity of the at least one CA period is fixed, wherein a duration of each of the at least one CA period is fixed.

6. The system of claim 1, wherein the at least one CA period comprises a plurality of uniformly spaced CA periods.

7. The system of claim 1, wherein the at least one CA period is utilized for messages with lower latency requirements than messages transmitted in the plurality of TDMA slots.

8. The system of claim 1, wherein a plurality of nodes of the network of nodes are allowed to simultaneously transmit messages in the at least one CA period.

9. The system of claim 1, wherein the at least one CA period supports transmissions on at least three frequencies.

10. The system of claim 1, wherein the at least one CA period supports transmissions of packets, wherein each packet of the packets includes a plurality of data pulses, each data pulse of the data pulses is assigned a data pulse start time, a frequency hop pattern, and a duration.

11. The system of claim 1, wherein the node comprises a processor, wherein the processor is configured to allocate a plurality of messages via the plurality of TDMA slots and at least one of low-latency or asynchronous messages via the at least one CA period, wherein the low latency messages have lower latency than the plurality of messages.

12. The system of claim 1, wherein the node comprises a processor, wherein the processor is configured to allocate transmit opportunities for each node of the network based at least on specific mission parameters.

13. The system of claim 1, wherein the node comprises a processor, wherein the processor is configured to allocate the at least one CA period and select nodes for CA service.

14. The system of claim 1, wherein the node comprises a processor, wherein the processor is configured to receive a request for CA transmit service from another node of the network.

15. The system of claim 14, wherein the processor is further configured to inform the other node of time and frequency hops parameters to use for transmitting the other node's data pulses within each of the at least one CA period.

16. The system of claim 14, wherein the processor is further configured to adjust a quantity of and duration of the at least one CA period allocated within the slot ring.

17. The system of claim 1, wherein the node comprises a processor, wherein the processor is configured to adjust a quantity of and duration of the at least one CA period allocated within the slot ring based at least on at least one of: a number of nodes that sign up for CA transmit service, a transmit latency requirement for signed-up nodes, or the slot ring.

18. The system of claim 1, wherein the node comprises a transmit input data processor, a transmit buffer controller, a TDMA transmit processing chain, a TDMA transmit queue, a CA transmit processing chain, a CA transmit queue, a transmit queue controller, a transmit queue, a data link radiofrequency (RF) transmitter, a datalink RF receiver, a receive input data processor, a receive queue controller, a TDMA receive queue, a TDMA processing chain, a CA receive queue, a CA receive processing chain, a receive buffer controller, and a receive packet buffer.

19. A method, comprising:
    configuring a network to be a combined time division multiple access (TDMA) and contention access (CA) waveform network utilizing a combined TDMA and CA waveform, wherein the combined TDMA and CA waveform includes a slot ring, wherein the slot ring includes a plurality of TDMA slots and at least one CA period,
    wherein the combined TDMA and CA waveform utilizes a strong error correction code rate as compared to a standard TDMA waveform, an increased data rate as compared to the standard TDMA waveform, and at least three transmit frequency channels to support CA transmissions.

\* \* \* \* \*